Sept. 25, 1956   W. A. YATES   2,764,734
PHASE ANGLE METHOD OF METAL THICKNESS INDICATION
Filed Oct. 3, 1952
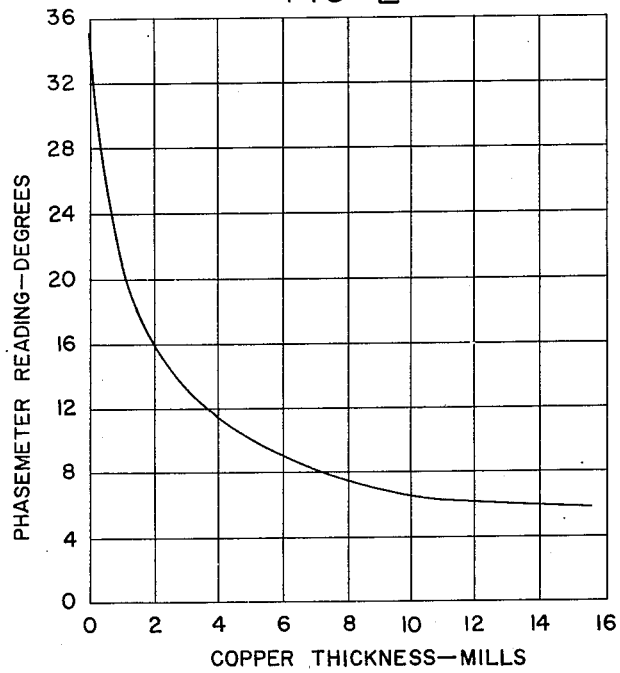
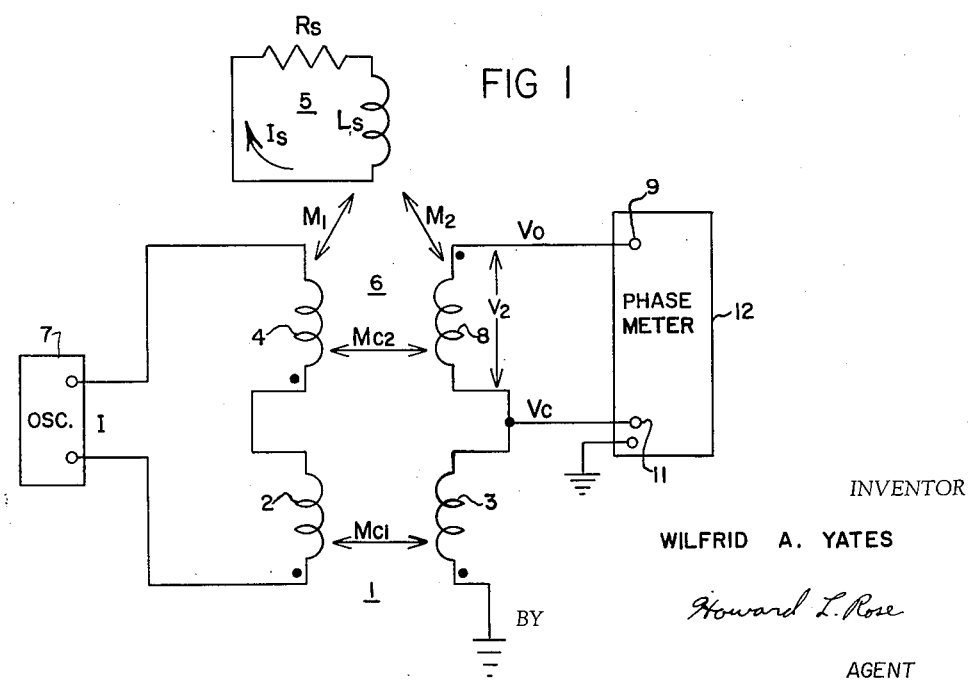
INVENTOR
WILFRID A. YATES
BY Howard L. Rose
AGENT

United States Patent Office 2,764,734
Patented Sept. 25, 1956

2,764,734

PHASE ANGLE METHOD OF METAL THICKNESS INDICATION

Wilfrid A. Yates, Silver Spring, Md., assignor to the United States of America as represented by the Secretary of Commerce Application October 3, 1952, Serial No. 313,092

7 Claims. (Cl. 324—40)

(Granted under Title 35, U. S. Code (1952), sec. 266)

The invention described herein may be manufactured and used by or for the Government of the United States for governmental purposes without the payment to me of any royalty thereon in accordance with the provisions of the Act of March 3, 1883, as amended (45 Stat. 467; 35 U. S. C. 45).

The present invention relates to a phase-angle meter for determining the thickness of a metal and in particular to a meter in which the determinations of thickness are independent of the distance of the test probe from the material under investigation.

Metal thickness measurements are of considerable importance in the quality control of plating processes and sheet metal production. Although there are at present a number of methods for making such determinations, only those methods which employ the principle of inducing eddy currents in a nonmagnetic metal are of interest here. The prior art eddy current devices suffer from the undesirable limitation that the test probe must either be maintained at a known distance from the metal under test or the probe must be kept in contact with the metal. In the first case it is very difficult to maintain the probe at a constant distance from the material under test particularly in production work, and therefore erroneous results are often obtained because the probe distance does vary. Where the method employed is the one in which the probe is made to contact the metal under test, difficulty is often encountered in systems where the material to be controlled is in constant motion with respect to the probe, since the constant motion causes a great deal of wear on the probe requiring constant replacement or repair.

It is therefore the primary object of the invention to provide a metal thickness gage whose performance is not dependent upon the distance of the probe from the metal being tested.

Another object of the invention is to provide a metal thickness gage the probe of which need not contact the material under investigation.

Another object of the invention is to provide a metal thickness gage which is applicable to one side of the surface.

Another object of the invention is to provide a relatively cheap, stable, and accurate metal thickness gage.

In accordance with the present invention there is provide a first transformer, the primary of which is connected in series with the primary of a second transformer. The secondary of the first transformer and of the second transformer are connected in series but in phase opposition. The two transformers used have characteristics which are as near alike as possible. The first transformer is isolated from the second transformer and is kept away from the material under test. The second transformer is wound on the test probe and during measurements is brought into relatively close relationship with the material under test. Since the voltages in the secondaries of the two transformers are in phase opposition when measurements are not being made and the transformers have practically equal outputs, the output taken from across the two secondaries will be zero. A phase meter having one input connected across the two secondaries in series and the other input connected across the secondaries of the first transformer alone will indicate the phase angle between these two voltages. When the test probe is brought close to the sample under test the phase of the voltage in the secondary of the second transformer will be altered according to the phase angle of the material under test, which phase angle is distinctive for each nonmagnetic metal. This will cause the phase meter to register and the thickness of the plating can be read directly from a calibration curve, or, if desired, the meter can be calibrated in advance for any particular sheet metal or any particular combination of a base metal and plating material. Because the meter works strictly on phase angle, there is no necessity for maintaining the probe a constant distance from the material under test. The only requirement relating to the distance of the probe from the sample is that the voltage induced in the secondary of the second transformer vary enough to cause the phase meter to operate.

Other uses and advantages of the invention will become apparent upon reference to the specification and drawings.

Figure 1 is a schematic diagram of an embodiment of the invention.

Figure 2 is a graph showing the variation in phase meter readings with plating thickness for a copper plating on a stainless steel base.

In Figure 1 there is shown a transformer 1 having a primary 2 and a secondary 3. The primary 2 is connected in series with the primary 4 of the transformer 6. The two primaries 2 and 4 are connected to a source of alternating current 7. The secondary 3 of the transformer 1 and the secondary 8 of the transformer 6 are connected in series but in phase opposition so that when the coupling $M_{c1}$ between the primary and secondary of transformer 1 and the coupling $M_{c2}$ between the primary and secondary of transformer 6 are equal the voltage $V_0$ is equal to zero with the specimen removed. In this figure, the sample under test 5 has been represented by its inductance $L_s$ and its resistance $R_s$. The transformer 6 together with its support (not shown) forms the test probe which is brought into close relationship with the sample when a test is to be made. The current flowing in the sample is taken as $I_s$ and the current flowing through the primaries of the transformers is taken as I. Since, as will become apparent subsequently, the current I in the two primaries must be of the same phase and amplitude, the series connection is used. However, if suitable means are employed to maintain this relationship, a parallel connection of the two primaries to the source may be used. The voltage across the secondary 3 is $V_c$ and the voltage across the secondary 8 is $V_2$. The voltage $V_0$ is the voltage taken from ground to the upper terminal 9 of the secondary 8. For the purposes of analysis the coupling between the primary 2 and secondary 3 is $M_{c1}$ and the coupling between the primary 4 and secondary 8 is $M_{c2}$. The coupling between the primary 4 and the material under test 5 is taken as $M_1$, and the coupling between the material under test and the secondary 8 is taken as $M_2$. The output terminals 9 and 11 are connected to the phase meter 12, the other terminal of which is grounded. The meter has two input circuits, one connected across terminal 9 to ground and the other connected across terminal 11 to ground. Therefore the meter measures the difference in phase between $V_0$ and $V_c$, each taken with respect to ground. Any of the four-terminal phase meters known to the art may be used, for example, one known as the Precision Phase Meter, Type 405, manufactured by the Advance Electronic Company, Incorporated, Passaic, New Jersey, has been satisfactorily employed. An analysis of this circuit, which will follow, will show that the phase angle measured at the terminals 9 and 11 is independent of the distance of the probe from the material under test 5. Since the secondaries 3 and 8 are connected in phase opposition, the voltage Vo is equal to Vc minus V2.

$$V_c = j\omega M_{c1} I$$

and $$V_2 = j\omega M_{c2} I - j\omega M_2 I_s$$

Therefore $$V_o = j\omega M_{c1} I - (j\omega M_{c2} I - j\omega M_2 I_s)$$

Since $M_{c1}$ and $M_{c2}$ are initially adjusted to be equal, the term $M_c$ will be used to replace $M_{c1}$ and $M_{c2}$.

Also $$I_s = j\omega M_1 I / (R_s + j\omega L_s)$$

By appropriate analysis of these equations it can be shown that:

$$\frac{V_o}{V_c} = \frac{\omega M_1 M_2}{M_c(\omega^2 L_s^2 + R_s^2)}(\omega L_s + jR_s) \quad (1)$$

Taking $\theta$ as the angle between the voltage vectors Vo and Vc, the tangent of $\theta$ is equal to $R_s/\omega L_s$. The only two terms in Equation 1 that vary with the distance of the probe, containing transformer 6, from the sample under test are $M_1$ and $M_2$, and it can be seen that, since the expression for the tangent of $\theta$ contains neither of these terms the phase angle does not vary with the distance of the probe from the sample under test as long as sufficient Vo voltage is present to actuate the meter 12.

It is known that all nonmagnetic metals have a characteristic phase angle at a given frequency and by referring to Figure 2, it will be shown how the meter of the present invention makes use of this phenomenon. The curve at the right side of the graph of Figure 2 is approaching the phase angle of copper. At the left side the curve is approaching the phase angle of stainless steel upon which the copper is plated in this particular example. If no copper were present the phase meter would indicate the phase angle of pure stainless steel and if the stainless steel were not present the meter would indicate the phase angle of the copper. Anything in between these two conditions would be indicative of the relative effects of the two. For the above to be true, however, it is essential that the induced eddy currents be confined to the sample under test, since if they were allowed to penetrate through the specimen into the air the reading would also be dependent to some degree upon the thickness of the base material. On the other hand it is also essential that the eddy currents penetrate through the plate into the base metal so that the effect of the base metal on phase angle is also taken into account. If these two conditions are met, the phase angles as shown in Figure 2 will be dependent upon the thickness of the copper plate, since the thickness of the plate will determine the depth of penetration of the currents into the stainless steel and therefore determines the relative effect of both materials on the phase angle reading.

Since these results are completely dependent upon the phase angles of the materials under test, it is obvious that a calibration curve must be developed for each plated material on a particular base metal. However, since several base metals have very high resistivities of approximately the same order of magnitude, the same calibration curve may be used for these metals. Of course, as long as one is measuring sheet metal, which may be considered as merely a special case of plating, the base material will always be air and one calibration curve will suffice for each metal to be tested. The frequency of the input current is determined by two considerations. As previously stated, the currents induced in the base material must always go to zero at some point in that material. Therefore the frequency of the source should always be high enough to insure that the eddy currents induced on the opposite face of the sample are essentially zero in amplitude. Also since it is necessary that the current exist at all times in both the base material and the plated material, the frequency must always be low enough to allow the eddy currents to penetrate through the plating into the base metal. It can be seen from this that as the thickness of the base metal or of the plating vary, the frequency of the input source may also have to be varied to insure that the above conditions exist. A frequency of 50 kilocycles has been found suitable as a starting point in most cases.

It will be apparent that the embodiments shown are only exemplary and that various modifications can be made in construction and arrangement within the scope of my invention as defined in the appended claims.

I claim:

1. A meter for determining the thickness of a metal, comprising a first means for producing a first voltage of a known magnitude and phase, a second means for producing a second voltage of a known magnitude and phase, means for varying the magnitude and phase of said second voltage in accordance with a thickness of a metal sample under test and means for measuring the phase angle between said first voltage and the sum of said first and said second voltages.

2. A meter for determining the thickness of a metal, comprising a first means for producing a first voltage of a known magnitude and phase, a second means for producing a second voltage of equal magnitude and 180 degrees out of phase with said first voltage, a nonmagnetic metallic sample, said second voltage varying in magnitude and phase when said second means is brought into close relationship with said sample and means for determining the phase angle between said first voltage and the sum of said first and said second voltages.

3. A meter for determining the thickness of a nonmagnetic metal comprising a first and a second transformer, the primaries of said transformer being connected in series and the secondaries of said transformers being connected in phase opposition, the mutual inductances of said transformers being such that the voltages induced in said secondaries are equal in magnitude in the absence of outside influence, and a phase meter, one input of which is connected across one of said secondaries and the other input of which is connected across both of said secondaries.

4. The method of determining the thickness of a nonmagnetic metal comprising supplying a first voltage of a known magnitude and phase, supplying a second voltage of a magnitude equal to said first voltage and 180 degrees out of phase with said first voltage, varying the magnitude and phase of said second voltage with the thickness of said metal under test and measuring the phase angle between said first voltage and the sum of said first and said second voltages.

5. A metal thickness gage comprising a first transformer having a first primary and a first secondary, a second transformer having a second primary and a second secondary, said first and second primaries having equal currents flowing through them, said first and second secondaries being connected in phase opposition, the mutual inductances of said transformers being equal under normal conditions, an electronic phase meter having two input circuits, one of said circuits being connected across both of said secondaries and a second of said circuits being connected across said first secondary and means for bringing the object to be tested into the magnetic field of said second transformer.

6. A metal thickness gage comprising means for producing a first voltage of a known phase and magnitude, means for producing a second voltage 180 degrees out of phase with said first voltage and of equal magnitude, said voltages being combined in a series circuit thereby canceling each other, means for varying the phase of said second voltage in accordance with the thickness of the metal being measured, and means for comparing the phase of said first voltage and the sum of said first and said second voltages.

7. The method of determining the thickness of a metal which comprises establishing a first voltage in a circuit, establishing a second voltage in the circuit which is equal in magnitude and opposite in phase to said first voltage, comparing the phase of said first voltage with the resultant of the phases of said first and said second voltages and varying the phase of said second voltage in accordance with the thickness of the metal to be measured.

References Cited in the file of this patent

UNITED STATES PATENTS

| | | |
|---|---|---|
| Re. 21,003 | Knerr et al. | Feb. 14, 1939 |
| 2,057,835 | Karajan et al. | Oct. 20, 1936 |
| 2,189,092 | Urmenyi | Feb. 6, 1940 |
| 2,415,789 | Farrow | Feb. 11, 1947 |
| 2,455,792 | Meunier | Dec. 7, 1948 |